Sept. 1, 1925.

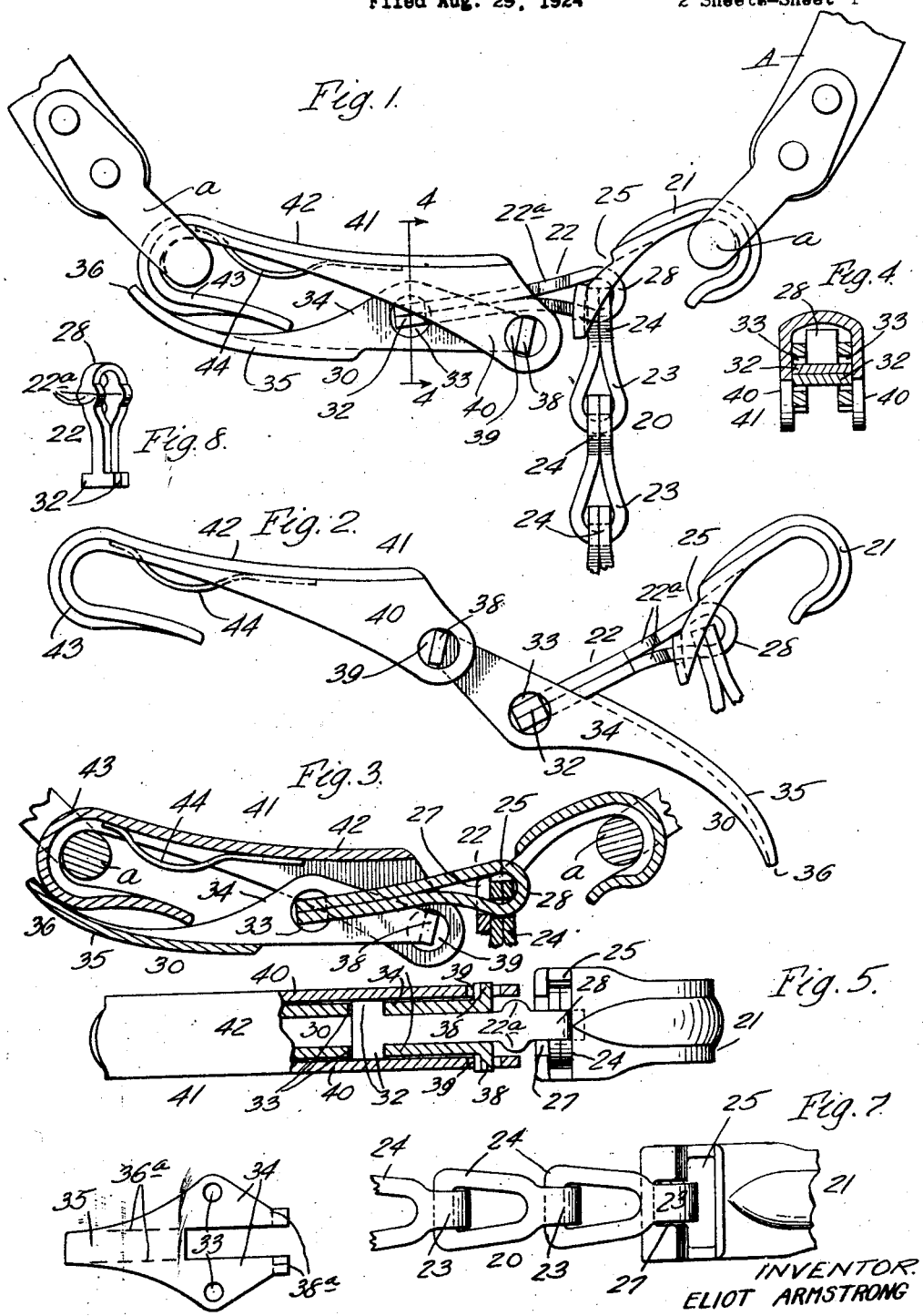

E. ARMSTRONG

HAME CHAIN

Filed Aug. 29, 1924    2 Sheets-Sheet 2

1,551,531

INVENTOR.
ELIOT ARMSTRONG

Parker, Prochnow & Bean
ATTORNEYS.

Patented Sept. 1, 1925.

1,551,531

UNITED STATES PATENT OFFICE.

ELIOT ARMSTRONG, OF NIAGARA FALLS, NEW YORK, ASSIGNOR TO NIAGARA METAL STAMPING CORPORATION, OF NIAGARA FALLS, NEW YORK.

HAME CHAIN.

Application filed August 29, 1924. Serial No. 734,891.

*To all whom it may concern:*

Be it known that I, ELIOT ARMSTRONG, a citizen of the United States, residing at Niagara Falls, in the county of Niagara and State of New York, have invented a new and useful Improvement in Hame Chains, of which the following is a specification.

This invention relates to improvements in adjustable hame chains or fasteners, and more particularly to fasteners of this sort which comprise a chain adapted to be attached to an end of one hame and a securing and tightening member adapted to be attached to the end of the other hame and having means whereby the chain may be adjustably connected thereto to draw the hames closely on the collar, by means of a swinging lever.

The main objects of the invention are to provide a hame fastener of this sort which is constructed entirely of sheet metal stampings; also to construct a fastener which may be adjusted more tightly than usual by hand, so that when the swinging lever is actuated to close the fastener, a very secure connection is provided which insures that the hames will be drawn tightly on the collar; also to improve the construction of the the body portions or members of hame fasteners so that these members will not injure the collars with which they engage; also to provide an improved chain for use with fasteners of this sort and to provide improved means engaging the chain to permit the chain to be easily adjusted and retained in any desired position, without detaching or taking the fastening apart.

Another object of the invention is to simplify the construction and reduce the cost of manufacture of hame fasteners and improve such devices in the other respects hereinafter specified and claimed.

In the accompanying drawings:

Fig. 1 is a face view of a preferred form of hame fastener constructed in accordance with this invention, showing the same in closed position on the hames.

Fig. 2 is a similar view showing the fastener opened and disconnected from the hames.

Fig. 3 is a longitudinal vertical section of the fastener with the parts in closed position.

Fig. 4 is a transverse section thereof on line 4—4, Fig. 1.

Fig. 5 is a plan view thereof, partly in section, showing the pivotal connections between the chain connecting member, operating lever and body member.

Fig. 6 is a plan view, on a reduced scale, of the blank from which the operating lever is formed.

Fig. 7 is a fragmentary plan view of the chain showing the means for obtaining the various adjustments thereof.

Fig. 8 is a perspective view of the chain connecting member, on a reduced scale.

Figure 15:
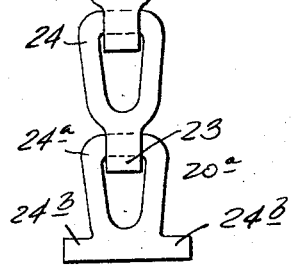
Fig. 15 is an elevation of the lower or free end of the chain and the pull or grip for actuating the chain.

Referring first to Figs. 1–8, the hame fastener shown therein includes a chain 20 having a connecting member 22 for maintaining a permanent connection between the chain 20 and a part of the hame fastener. The chain also has an adjustable connection with a hook member 21 for detachably securing the chain to the hame loop *a* of one of the hames A. The links of the chain are preferably formed of sheet metal stampings and are each provided with a loop 23, and an eye 24 which enters the loop of an adjacent link. The chain 20 is adapted to pass freely through an aperture or opening 25 in the shank of the hook 21 for permitting the distance between the hame loops *a* to be varied, said aperture being, in the construction shown, substantially T shaped and having an enlarged portion which is wide enough to allow the eye portions 24 to pass therethrough, and a reduced portion 27 at the end farthest removed from the hook which connects with the enlarged portion of the aperture into which the loop 23 of any of the links may enter. When a loop portion of the chain is in the reduced portions of the aperture, the chain will be held and releasably connected to the hook by the engagement with the adjacent eye of the next link with the shank of the hook and will be prevented from passing from the reduced portion 27 into the enlarged portion 25 as long as tension or pull is exerted on the hame fastener, through the connecting member 22. The free end of the chain 20 is preferably provided with a hand pull and retainer, see Fig. 15, formed of a single stamping 20ª having at one end an eye 24ª like the eyes 24 of the chain links, and at the other a pair of offset lugs 24ᵇ which provide a hand grip to enable the chain to be pulled tightly, these lugs also forming a retainer adapted to engage the side edges of the hook member 21 and prevent the chain from passing out of the aperture 25 when the hames are spread apart in attaching or detaching them from the collar.

The connecting member 22 is formed of a narrow strip of sheet metal bent upon itself to form at one end a loop 28 engaging in the eye of the first chain link, while the shank of the member is formed by lapping the two ends of the strip together. The connecting member is adapted to pivotally connect the chain 20 and hook member 21 to an operating and locking lever 30, and for this purpose the two ends of the metal strip are provided with integral, offset, rectangular portions, the adjacent pairs of which form pivots 32 of substantially square cross section adapted to extend into circular bearing holes 33 in longitudinally extending parallel webs 34 of the lever 30, and between which the shank of the member 22 extends. The intermediate portion of the shank of the connecting member 22 is preferably provided with rounded laterally extending ears 22ª which are adapted to engage the adjacent end of the hook 21 and prevent the accidental disconnection of the member 22 from the reduced portion 27 of the aperture, and consequently loosening of the chain 20 when the fastening is adjusted, so that the connecting member 22 is in direct contact and centrally alined with the hook member 21. The webs 34 of the lever 30 are connected at one end by a transverse web 35 forming a U-shaped member having a longitudinally extending operating handle 36, while the other ends of the webs terminate in offset, outbent, rectangular pivot lugs 38 which are adapted to enter circular holes 39 in side webs 40 of a body member 41 and pivotally connect the lever 30 thereto. The operating or locking lever 30 is formed of a single sheet metal stamping, as shown in Fig. 6, which is bent on the dotted lines 36ª 38ª to form the handle 36 and pivot lugs 38 respectively. The lugs 38 are easily formed by the stamping process and by their use provide a simple and direct means of connecting the lever 30 to the body member 41, as it is only necessary when assembling the fastening to bend the side webs 40 of the body member so as to straddle the lever 30 and engage the lugs 38 in the holes 39.

The body member is also formed of a sheet metal stamping and preferably comprises the side webs 40 and a back piece 42 connecting these webs to produce a U-shaped member adapted to straddle the lever 30. The body member, like the lever 30, is formed from a flat blank, which is bent to the desired shape when assembling the fasteners to engage the pivots 38 in the holes 39. The back piece is preferably continued endwise at that end opposite the portions 40 to provide a connecting part whereby the hame fastening may be attached to the other hame loop a. This connection is in the form of a hook 43, the bottom of which engages the loop a and the free end being extended towards the opposite end of the body member for some distance beyond the loop a, and the body member is further provided with a resilient bent spring 44 secured to the under side of the back piece 42 and extending toward the end of the hook so that the distance between the spring and this hook end is less than the thickness of the hame loop a. The spring, therefore, must be flexed to permit the hook to be connected to the loop, and when the connection has been made, restrains the hook from becoming accidentally detached.

The described construction of the body member 41 provides a relatively long and wide upper surface which is smooth and free from obstructions, and is curved both lengthwise and transversely to fit closely to the collar and bear thereon over a considerable area. Further this formation is such that the body member will not gouge into the collar or pinch portions thereof between the member and other parts of the hame fastening.

The hame fastening, constructed of sheet metal stampings, as described, is adapted to be inexpensively and expeditiously produced in large quantities. In assembling the fastening, the chain links are first connected and the connecting member 22 attached to one end of the chain, after which the member 22 is passed through the aperture 25 of the hook member 21. The flat blank for the lever 30 is now placed in relation to the connector 22 and the webs 34 bent so as to straddle the connector with the bearing holes 33 encircling the square pivots 32 thereof. The body member 41 is similarly arranged and bent so as to locate the pivot lugs 38 in the holes 39 thereof.

The chain 20 is easily adjusted in the hook member 21 by pulling on the chain, and by drawing it as tightly as possible, a secure connection is had. The aperture 25 is large enough to permit the eyes 24 of the chain to pass easily through the enlarged portion thereof while the reduced portion 27 holds the loop portion of the adjacent link and prevents the chain from slipping back. The chain may be adjusted quite tightly by hand, and the subsequent locking movement of the lever 30 will place an additional tension on the chain and other parts of the fastening and hold the loop in the reduced portion of the aperture. By throwing the lever to the unlocking position the chain will be loosened and may be drawn inwardly through the aperture 25 as far as the hand pull 20ª to permit the removal or attachment of the hames to the collar, without taking the attachment apart.

In the use of the device, the lever 30 is positioned as in Fig. 2 with the pivots 32 at the right of the pivots 38, and the hooks 21 and 43 are then attached to the hame loops *a*. The chain 20 is now adjusted in the aperture 25 to draw the hames A as tightly as possible on the collar by hand. The lever 30 is now actuated to strain or draw up the hame fastening by swinging it downwardly and to the left so as to position the pivots 32 to the left beyond the dead center position relatively to the pivots 38, with the handle 36 of the lever bearing against and closing the hook 43. In the open position of the device, the inner transverse edge of the web 35 of the lever 30 is adapted to strike against the shank of the connecting member 22 and form a stop for the lever.

Figure 14:
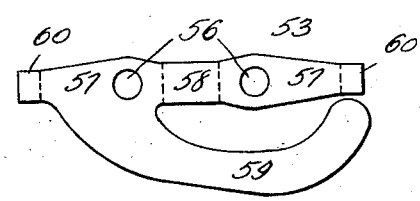
Fig. 14 is a face view of the blank from which the operating lever thereof is formed.

The modified form of hame fastening shown in Figs. 9–15 is also constructed of sheet metal stampings and comprises opposite hook members 50, 51, an adjusting chain 52, a combined connecting member and operating or locking and releasing lever 53, and a body member 54. In this construction the hook 50 is connected directly to the member 53 by lateral pivot lugs 55 engaging in round holes 56 in the side web portions 57 of the member. These webs 57 are connected by a transverse cross piece 58 and the member is provided with an integral handle 59 which may be formed by an extension of one of the side webs 57. As shown in Fig. 14, the member 53 is formed from a flat blank adapted to be bent on the dotted lines to produce the webs 57, cross piece 58, handle 59, and a pair of offset lateral pivot lugs 60. The stamping shaped as shown may be produced from a relatively small portion of stock with very little waste. The pivot lugs 60 provide means for pivotally connecting the member 53 to the body member 54, as by engaging them in the round holes 61 in the side webs 62 of said body member. The webs 62 of the body member are connected between the ends by a substantially flat intermediate member or back piece 63 adapted, in use, to engage the collar, and at the end opposite the holes 61 by a cross piece 64 forming a slot or aperture 66 between the back piece 53 and cross piece 64. The chain 52 is connected directly to the hook 51 and is adapted to pass through the aperture 66 and be retained in adjusted position by the engagement of the chain links in the reduced portion of the aperture, as described in connection with the construction shown in Figs. 1–8.

Figure 9:
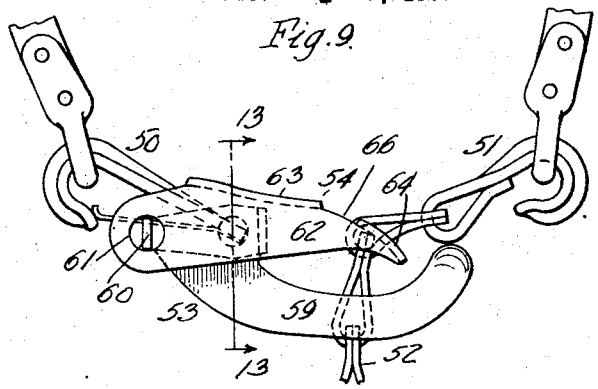
Figs. 9 and 10 are views similar to Figs. 1 and 2, showing a modified form of hame fastener.
Figure 10:
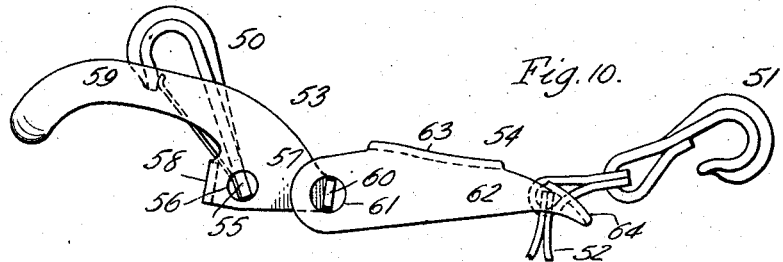
Figure 11:
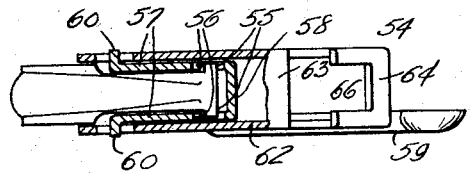
Fig. 11 is a plan view thereof, partly in section.
Figure 12:
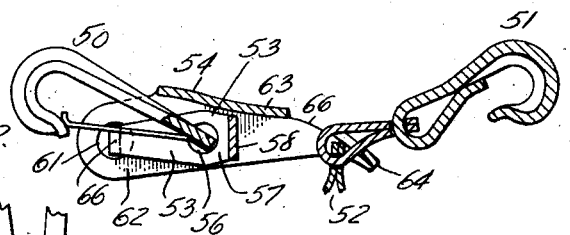
Fig. 12 is a longitudinal sectional elevation thereof with the parts as in Fig. 9.
Figure 13:
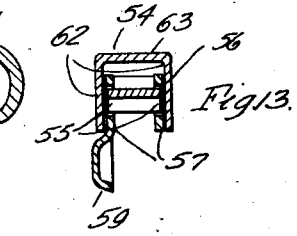
Fig. 13 is a transverse sectional view thereof on line 13—13, Fig. 9.

As in the first construction, the hooks 50, 51 are engaged in the hame loops *a* while the parts are in the position shown in Fig. 10 with the pivots 55 at the left of the pivots 60. After the chain 52 has been properly positioned in the body member and releasably connected thereto by engaging one of its links in the aperture 66, the lever 59 is swung downwardly and to the right to carry the pivots 55 past the pivots 60 and beyond the dead center as in Fig. 9, whereby the fastener is placed under tension and the hames A drawn tightly on the collar. The parts are assembled as before described, by bending the flat blank of the member 53 so that the webs 62 straddle the hook 50 to engage the pivots 55 in the holes 56, and then by repeating this operation with the body member the pivots 60 are engaged and retained in the holes 61. Thus the parts are all secured in operative relation to each other by simple bending operations without the use of rivets or journal pins or other separate fastening devices. The stampings are adapted to be quickly and cheaply made from relatively small portions of stock with the minimum of waste material. The fasteners are light, strong and durable and produce a neat finished appearance to the harness on which they are applied.

I claim as my invention:—

1. In an article of the character described, the combination of a one-piece sheet metal body member having spaced side flanges, an actuating and locking lever formed of a single sheet metal stamping having spaced side webs, said lever being disposed between said flanges of said body member and having integral offset portions adapted to pivotally connect said lever to said body member, and a connecting member comprising a single sheet metal stamping formed with integral portions adapting it to be pivotally secured on said operating lever.

2. In an article of the character described, the combination of a one-piece sheet metal body member having spaced side flanges, an actuating and locking lever formed of a single sheet metal stamping having spaced side webs, said lever being disposed between said flanges of said body member and having integral offset portions adapted to pivotally connect said lever to said body member, a sheet metal connecting member disposed between the webs of said lever and having integral portions adapting it to be pivotally secured to said lever, a chain attached to said connecting member, and a hook having means whereby said chain may be adjustably secured thereto.

3. In an article of the character described, the combination of a one-piece sheet metal body member having spaced side flanges, an actuating and locking lever formed of a single sheet metal stamping having spaced side webs, said lever being disposed between said flanges of said body member and having integral offset portions adapted to pivotally connect said lever to said body member, a sheet metal one-piece connecting member having integral laterally disposed and oppositely directed lugs adapted to form pivotal connections between said link and said lever, and a chain attached to said connecting member, and means for adjusting and holding said chain in its adjusted positions.

4. In an adjustable hame fastener, the combination of a chain, a member adapted to be secured to one of the hames and to which said chain is secured, a second member secured to the other hame and relatively to which said chain is adjustable, said chain comprising a plurality of links each having a wide portion and a narrow portion and said second member being formed with an aperture through which said link eyes may pass to permit said fastener to be adjusted and said aperture having a reduced portion adapted to receive said link loops to permit said chain to be adjusted and initially tightened, and to hold said chain in adjusted positions and prevent the passage of said link eyes therethrough, and a pivoted lever adapted to be actuated to exert a final tightening of said chain to cause said fastener to draw and hold the hames securely in position.

5. In an adjustable hame fastener, the combination of a chain, a member adapted to be secured to one of the hames and to which said chain is secured, a second member secured to the other hame and relatively to which said chain is adjustable, said chain comprising a plurality of links each having a wide eye portion and a narrow loop portion, said second member being formed with a part having an aperture therein provided with an enlarged portion adapted to permit the passage of said chain therethrough and a reduced portion adapted to receive the narrow loop portions of said chain links whereby said chain is adapted to be adjusted and initially tightened, and the portions of said part adjacent said reduced portion being adapted to engage the wide eye portions of said links to prevent movement of said chain in said aperture when said fastener is in locked position, and a pivoted lever adapted to be actuated to exert a final tightening of said chain to cause said fastener to draw and hold the hames securely in position.

6. In an adjustable hame fastener, the combination of a sheet metal body member, a sheet metal actuating and locking lever pivoted thereto, an adjusting chain attached thereto, hook members for securing said fastener to the hames and one of which is connected to said chain, and means for adjusting said chain relatively to the last hook member, said body member being formed from a single sheet metal stamping and having a back portion provided with a relatively long and wide upper face curved longitudinally and transversely to conform to and engage the collar with which the fastener is used and adapted to move relatively thereto without injuring said collar when said lever is actuated.

7. In an adjustable hame fastener, the combination of a hook member, a chain having an adjustable connection therewith, a one-piece sheet metal connecting member having a loop for connection with said chain and integral oppositely directed offset pivot lugs, and a one-piece sheet metal actuating and locking lever having side portions adapted to straddle said connecting member and provided with holes into which said connecting member pivots are received.

8. In an adjustable hame fastener, the combination of a hook member, a chain having an adjustable connection therewith, a one-piece sheet metal connecting member having a loop for connection with said chain and also having integral oppositely directed offset pivot lugs, a one-piece sheet metal actuating and locking lever having side portions adapted to straddle said connecting member and provided with holes into which said connecting member pivots are received, integral oppositely directed offset lugs on said lever, and a one-piece sheet metal body member having side portions adapted to straddle said locking lever and provided with holes into which said lever pivots are received, whereby said lever may be actuated to move said connecting member relatively to said body member.

9. In an adjustable hame fastener, the combination of a one-piece sheet metal body member formed with a pair of spaced side webs each having a rounded hole therein, a one-piece sheet metal actuating and locking lever having a handle portion and a pair of spaced side webs, an integral offset outwardly directed rectangular lug on each of said lever webs which is adapted to be received and bear in the hole in one of said body member webs and form a pivotal connection between said lever and body member, each of said lever webs having a round hole, and a one-piece sheet metal connecting member having a pair of oppositely disposed and outwardly directed rectangular lugs adapted to be received and bear in the holes in said lever to form a pivotal connection between said connecting member and said lever.

10. In an adjustable hame fastener, the combination of a sheet metal body member, a sheet metal actuating and locking lever pivoted thereto, an adjusting chain comprising a plurality of links each having a wide eye portion and a narrow loop portion, hook members for securing said fastener to the hames, one of said hook members having an aperture through which said link eyes may pass to permit said fastener to be adjusted and a reduced portion adapted to receive said link loops to hold said chain against movement in said aperture, a connecting member having a loop for connection with said chain and a pivotal connection with said lever, and offset integral side portions on said connecting member adapted to engage the portions of said hook member adjacent said reduced portion of the aperture to prevent the unintentional disengagement of said chain from said hook member when the fastener is in locked position.

11. In an adjustable hame fastener, the combination of a sheet metal body member, a sheet metal actuating and locking lever pivoted thereto, an adjusting chain, hook members for securing said fastener to the hames, one of said members having an aperture through which said chain may freely pass and said aperture having a reduced portion for engaging and holding said chain when said fastening is locked, and a connecting member formed of a single sheet metal stamping having a loop for connection with said chain, a pair of offset integral pivot portions for pivotal connection with said locking lever, and a pair of offset side portions adapted to engage said hook member to prevent the unintentional disengagement of said chain therefrom when said fastener is in locked position.

ELIOT ARMSTRONG.